Patented Mar. 8, 1927.

1,620,365

UNITED STATES PATENT OFFICE.

HANS LEHRECKE, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

PROCESS FOR THE EVOLUTION OF HYDROCYANIC ACID.

No Drawing. Application filed October 20, 1925, Serial No. 63,790, and in Germany November 6, 1924.

Addition compounds of hydrocyanic acid with metals have been described in the literature. Klein, Ann. 74 page 88, has given a preparation of the iron addition products wherein he shows 2 moles of hydrocyanic acid may be held by 1 mole of iron chloride. Wöhler, Ann. 73 page 227, has described the addition products of hydrocyanic acid with titanium chloride wherein 1 mole of the salt takes up 1 mole of the hydrocyanic acid. Perrier C. R. 1895, 120, 1424 has made known two addition products of hydrocyanic acid with aluminum chloride; aluminum chloride according to this may take up either 1 or 2 moles of hydrocyanic acid depending upon the method of preparation.

I have now found that zinc chloride on treatment with hydrocyanic acid is able to take up 3 moles hydrocyanic acid per mole of the salt. A great advantage is thus seen in the use of zinc chloride since for a definite amount of hydrocyanic acid a considerable less amount of the metallic salt is necessary than when using previously known materials.

The industrial preparation of this hydrocyanic acid-zinc chloride addition product offers no great difficulty. Anhydrous zinc chloride is treated with an excess of anhydrous hydrocyanic acid and the resulting product finally freed of the excess gas. This product is stable in dry air, but decomposes upon treatment with water with the liberation of hydrocyanic acid. On account of this last mentioned property this product is especially suitable for uses where hydrocyanic acid is to be developed as for example destruction of pests of any sort. It is seen that for any use the zinc chloride addition product is much more suitable than any of the previously known compounds in that there is a higher concentration of hydrocyanic acid per unit weight of material.

In one of the applications of the material of this invention the evolution of hydrocyanic acid is accomplished by treatment with water in the presence of compounds of high heat of hydration and solution as disclosed in my copending applications Serial Nos. 63,787, 63,788 and 63,789 of even date herewith. Such compounds are for example iron chloride, aluminum chloride, zinc chloride, aluminum sulfate, magnesium chloride, zinc sulfate, calcium chloride or phosphoric anhydride. These materials may be mixed with the zinc chloride hydrocyanic acid product after it has been prepared. In case zinc chloride is to be used as a heat evolving material the zinc chloride containing product can be made with the use of an excess of zinc chloride.

In one of the modifications of the use of material of this invention irritant gases are caused to be evolved simultaneously with the hydrocyanic acid. This is accomplished for example by mixing with the zinc chloride compound such materials as calcium hypochloride, sodium hypochlorite, bleaching powder and the like. In case any of these substances mentioned are used the highly lachrymatory cyanogen chloride is evolved as an irritant. This simultaneous evolution of irritant gas from the hydrocyanic acid addition product is disclosed in my accompanying application Serial No. 63,789 filed of even date herewith.

It has also been shown from the accompanying application above mentioned that various other materials may be mixed with the hydrocyanic acid-zinc chloride addition product for various purposes. Thus porous or granular bodies such as pumice, diatomaceous earth, coke, sand, sawdust, or common salt are suitable. These materials are usually added in order that the hydrocyanic acid bearing material may be diluted, more easily spread about and give a more rapid evolution of hydrocyanic acid. It has also been found advantageous to add materials which will have a binding effect upon the powdered product and then to form briquettes of various sizes.

Claims:

1. Process for the evolution of HCN which consists in exposing an addition product of zinc chloride and HCN to moisture.

2. Process for the evolution of HCN which consists in treating an addition product of zinc chloride and HCN with water.

3. A product of manufacture comprising an addition product of hydrocyanic acid with zinc chloride.

4. A product of manufacture consisting in zinc chloride with hydrocyanic acid loosely held in combination therewith in the ratio of 3 moles hydrocyanic acid per mole of zinc chloride.

5. A product of manufacture consisting in zinc chloride with hydrocyanic acid held in combination therewith and capable of being set free on treatment of the compound with water.

6. A product of manufacture consisting in anhydrous zinc chloride with hydrocyanic acid held in combination therewith and capable of being set free on treatment of the compound with water, the components being present in the ratio of 3 moles of hydrocyanic acid per mole of zinc chloride.

Signed at Frankfort a/m., Germany, this 1st day of October A. D. 1925.

DR. HANS LEHRECKE.